United States Patent [19]

Carter et al.

[11] Patent Number: 5,578,911
[45] Date of Patent: Nov. 26, 1996

[54] METHOD AND APPARATUS FOR POWER REGENERATION IN AN ELECTRIC VEHICLE MOTOR DRIVE USING A DEADTIME GENERATOR AND HAVING CONTINUOUSLY VARIABLE REGENERATION CONTROL

[75] Inventors: James C. Carter, Clarkston; Joseph F. Impullitti, Farmington Hills, both of Mich.

[73] Assignee: Chrysler Corporation, Auburn Hills, Mich.

[21] Appl. No.: 309,697

[22] Filed: Sep. 21, 1994

[51] Int. Cl.⁶ .................................................. H02P 3/00
[52] U.S. Cl. .................................... 318/376; 318/254
[58] Field of Search ................................ 318/375, 376, 318/139, 798–815, 439, 254, 138

[56] References Cited

U.S. PATENT DOCUMENTS

| | | | |
|---|---|---|---|
| 3,840,790 | 10/1974 | Stich et al. | 318/254 |
| 4,051,418 | 9/1977 | O'Berto et al. | 318/269 X |
| 4,371,824 | 2/1983 | Gritter | 318/801 X |
| 4,454,573 | 6/1984 | Petsch et al. | 363/98 |
| 4,520,300 | 5/1985 | Fradella | 318/138 X |
| 4,697,131 | 9/1987 | Schauder et al. | 318/803 X |
| 4,710,686 | 12/1987 | Guzik | 318/293 |
| 4,901,366 | 2/1990 | Rottger | 388/811 |
| 4,988,939 | 1/1991 | Reichard et al. | 318/800 |
| 5,086,261 | 2/1992 | Sakata et al. | 318/268 |
| 5,210,475 | 5/1993 | Juzswik et al. | 318/293 |
| 5,225,758 | 7/1993 | Sakano et al. | 318/701 |
| 5,253,724 | 10/1993 | Prior | 180/65 |
| 5,319,291 | 6/1994 | Ramirez | 318/254 |
| 5,436,540 | 7/1995 | Kumar | 318/375 |

Primary Examiner—Jonathan Wysocki
Attorney, Agent, or Firm—Margaret A. Dobrowitsky

[57] ABSTRACT

A motor control circuit is disclosed for providing a continuously variable regeneration control. The control circuit includes a microcomputer for generating a power regeneration command signal and a motor command signal, and an armature circuit for use with DC and induction motors. The armature circuit is responsive to the motor command signal for operating the controlled motor in a motor drive mode. The armature circuit is further responsive to the power regeneration command signal for controlling the degree of power regeneration. The armature circuit includes a deadtime generator, responsive to the motor command signal for generating a pair of complementary motor drive signals, the inverted signal of the pair having deadtime. The inverted motor drive signal with deadtime is AND'ed with the power regeneration command signal to produce a power regeneration drive signal. The non-inverted motor drive signal and the power regeneration drive signal are applied to a Class C two-quadrant chopper drive circuit. The chopper circuit alternately and in accordance with these drive signals respectively energizes the motor (motor drive mode) and causes the motor to recharge the battery (power regeneration mode).

21 Claims, 5 Drawing Sheets

METHOD AND APPARATUS FOR POWER REGENERATION IN AN ELECTRIC VEHICLE MOTOR DRIVE USING A DEADTIME GENERATOR AND HAVING CONTINUOUSLY VARIABLE REGENERATION CONTROL

TECHNICAL FIELD

This invention relates generally to a method and a system for controlling the regeneration of power from an electric motor. In particular, this invention relates to a method and apparatus for controlling power regeneration in an electric vehicle motor drive using a deadtime generator and having variable regeneration control.

BACKGROUND ART

Methods for controlling motors have been under development for some time. In particular, there have been advances in the design and development of a regeneration circuit used to control the charging of a battery of an electrically powered vehicle by converting vehicle mechanical energy into electrical energy. However, prior art controls in this area have proven unsatisfactory because of their low utilization of the vehicle mechanical energy.

Now referring to FIG. 1, in the prior art it is common to use a pulse width modulation technique (hereinafter PWM) for controlling the electric motors of electric vehicles. In such an arrangement, motor 10 is powered by battery 12 to delivery mechanical power 14 to the drive shaft of the vehicle. Motor 10 is pulsed on and off by the presence of signal 16, generated by drive control, or microprocessor 18, to semiconductor switch 20, which is typically a power MOSFET. The arrangement shown in FIG. 1 is known as a class B chopper circuit. When switch 20 is not switched on (motor coasting), steering diode 22 and resistor 24 dissipate any energy generated by the motor 10. As shown in FIG. 1B, switch 20 is closed (motor on or driving) when signal 16 is high, shown by motor "on" interval 26; similarly, switch 20 is open (motor coasting) when signal 16 is low, shown by motor "off" interval 28. Only during vehicle braking is energy (which is generated by motor 10) returned to the battery 12 (circuit for this is not shown). This brake-only regeneration is used due to the problem of being able to guarantee that, if a semiconductor switch was used in place of steering diode 22, the upper and lower semiconductors switches would never be on at the same time. Having the upper and lower semiconductor switches on simultaneously can cause catastrophic failure of the switches (i.e., the battery will be effectively short-circuited). Some progress has been made toward alleviating this problem, in general, by the development of the concept of "deadtime." Deadtime is a time interval injected prior to and after the drive signal for either the upper or lower semiconductor switches so that both of the switches won't be "on" at the same time.

A further problem encountered by the prior art involves the dependency of power regeneration on the duty cycle of the PWM signal 16. That is, for a given period of signal 16 (the sum of "on" interval 26 and "off" interval 28), the regeneration time (interval 28) is inversely proportional to the motor drive or "on" interval 26. Since a torque braking effect is imparted by motor 10 when operating in a power regeneration mode, this lack of flexibility in the control of the power regeneration time results in relatively undesirable drivability characteristics in electric vehicles, when compared to vehicles equipped with internal combustion engines.

Thus there is a need to provide an improved apparatus and method for power regeneration in an electric vehicle motor drive that is directed to overcoming one or more of the problems as set forth above.

SUMMARY OF THE INVENTION

This invention generally provides a control for efficiently operating an electric vehicle motor drive in a way that models the "dynamic braking" characteristics of an internal combustion engine based vehicle. An apparatus constructed in accordance with the present invention includes a control means for generating a motor command signal, a deadtime generator responsive to the motor command signal for generating a motor drive signal, and for further generating an inverted motor drive signal having deadtime (i.e., a delay injected before the inverted motor drive signal goes high and before the inverted motor drive signal goes low), and a motor drive circuit energizable by a power source and coupled to the inverted motor drive signal having deadtime for causing the motor to operate in a power regeneration mode when the inverted signal is asserted, wherein power generated by the motor is delivered to the power source. The present invention further provides that the motor drive circuit be coupled to the generated motor drive signal for causing the motor to operate in a motoring mode where the signal is asserted, wherein power from a power source is delivered to the motor to operate the motor.

In a further embodiment of the present invention, the control means is responsive to a plurality of operating parameter signals (i.e., throttle position) for generating a regeneration command signal, the apparatus further comprising logic means responsive to the regeneration command signal and the inverted motor drive signal for generating a regeneration drive signal. The motor drive circuit of this further embodiment of the present invention is responsive to the regeneration drive signal to operate the motor in the power regeneration mode.

In another aspect of the present invention, a method of motor control in an electric vehicle motor drive system is provided. The method comprises the steps of generating a motor drive signal, inverting the motor drive signal, injecting a preselecting deadtime into the inverted motor drive signal, and operating the motor in a power regeneration mode using the inverted motor drive signal having deadtime.

In a further embodiment of this aspect of the present invention wherein the system includes a motor drive circuit for operating the motor in a power regeneration mode, the method further comprises the step of generating a regeneration command signal, and wherein the operating the motor in a power regeneration mode step includes the substeps of: producing a regeneration drive signal using the regeneration command signal and the inverted motor drive signal having deadtime, and, applying the regeneration drive signal to the motor drive circuit to operate the motor in a power regeneration mode.

These and other objects of this invention will become apparent to one skilled in the art from the detailed description and the accompanying drawings illustrating features of this invention by way of example.

DETAILED DESCRIPTION OF THE PREFERRED EMBODIMENTS

Figure 2A:
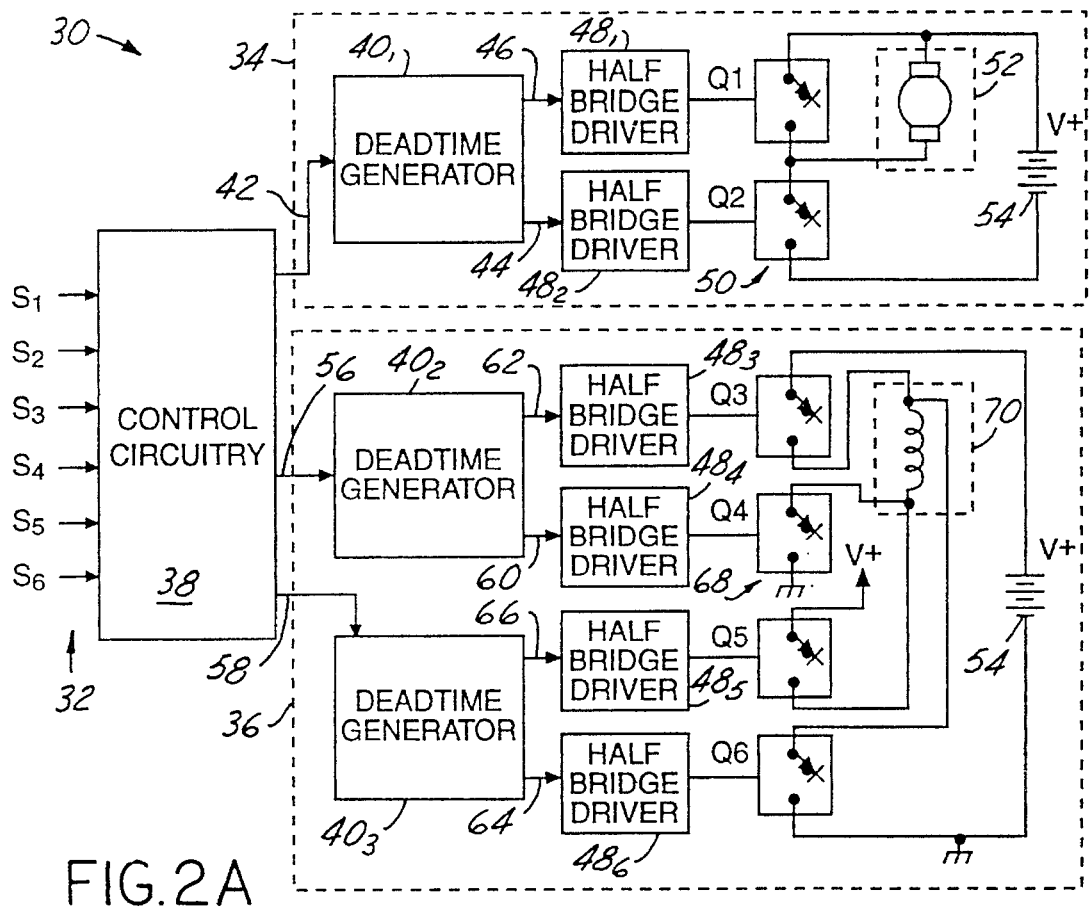
FIG. 2A is a partial equivalent schematic and block diagram of a motor control in accordance with the present invention adapted to control a direct current (DC) motor and including control circuitry, an armature circuit, and a field circuit.

Referring now to the drawings wherein like reference numerals are used to reference identical components in various views, FIG. 2A shows a DC motor control system 30 in accordance with the present invention. System 30 includes control circuitry 32 for controlling the DC motor control system 30, an armature circuit 34 coupled to control circuitry 32 for energizing an armature of a DC motor under control, and a field circuit 36 coupled to control circuitry 32 for energizing a field winding of the controlled motor.

As shown in FIG. 2A, control circuitry 32 includes a programmable electronic control module 38 and a means for detecting at least one operating parameter and generating a parameter indicative signal ($S_{1-6}$), hereinafter referred to as input data signals which are indicative of the respective operating parameter detected. Control module 38 is programmed with multi-dimensional control strategies or logic maps, as well as with a data structure representative of the torque braking effect imparted by an internal combustion engine, which take into account the operating parameter signals to generate a motor command signal and power regeneration command signal, both signals to be described in greater detail below. Control module 38 may take the form of a commercially available microcomputer, such as MC68HC16Y1 manufactured by Motorola. The input data signals include throttle position signal $S_1$, brake signal $S_2$ to indicate when the vehicle operator has braked, vehicle speed signal $S_3$, motor speed signal $S_4$, battery condition signal $S_5$ to indicate, for example, voltage or current, and electronic's temperature signal $S_6$, which may include the temperature of the semiconductor switches, and the temperature of the motor.

Armature circuit 34 includes deadtime generator $40_1$ responsive to motor command signal 42 generated by control module 38. Deadtime generator $40_1$, generates a motor drive signal 44 and a motor drive with deadtime signal 46. Signals 46 and 44 are respectively conditioned by half-bridge driver circuits $48_1$ and $48_2$ to be applied to motor armature drive circuit 50. motor armature drive circuit 50 includes semiconductor switches Q1 and Q2, armature 52 of the DC motor being controlled by system 30, and power source 54.

Control module 38 generates motor command signal 42 as follows. Control module 38 translates throttle position, indicated by signal $S_1$, into a torque request. Control module 38 further determines vehicle speed, motor rpm and required motor torque, and from these determinations and further as a function of battery condition ($S_5$) and electronic's temperature ($S_6$), determines the required armature current in accordance with a preselected control strategy. For example, when the motor temperature and/or semiconductor switch temperature is relatively high, less current (and accordingly less torque) will be determined. Accordingly, the duty cycle of motor command signal 42 is variable, based on the foregoing inputs and the selected control strategy.

Figure 4A:
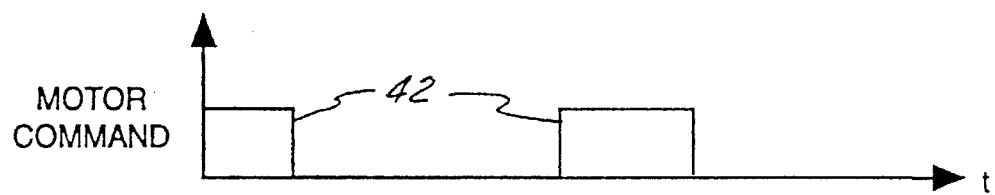
FIG. 4A is a partial timing diagram of a motor command signal generated by the control circuitry of FIG. 3.
Figure 4B:
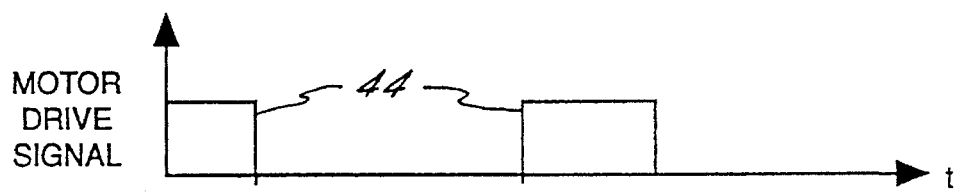
FIG. 4B is a partial timing diagram of a motor drive signal generated by the deadtime generator of FIG. 3.
Figure 4C:
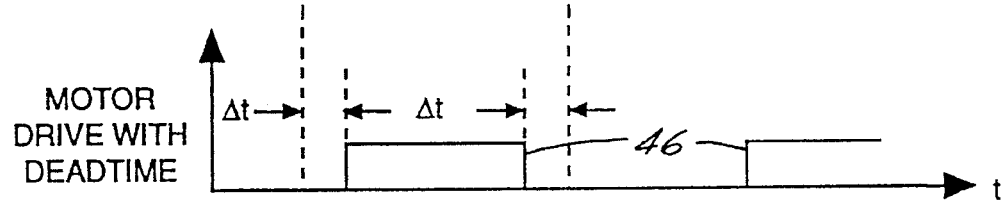
FIG. 4C is a partial timing diagram of a motor drive with deadtime signal generated by the deadtime generator shown in FIG. 3.

Deadtime generator $40_1$ is included to inject the required deadtime to convert pulse width modulated (PWM) motor command signal 42 into separate logic signals 44 and 46. Deadtime generator $40_1$ reproduces motor command signal 42 as motor drive signal 44. Deadtime generator 40 further generates a second signal, an inverted motor drive signal having deadtime signal 46 (i.e., motor drive with deadtime 46). Referring to FIGS. 4A–4C, signal 46 is "on" only during the "off" time of signal 44 with a precise deadtime/t at the start and finish of signal 46. Deadtime generator $40_1$ may make the form of a commercially available component, such as IXDP630/IXDP631, available from IXYS Corporation, San Jose, Calif.

Signal 44, when active, causes circuit 50 to operate a controlled motor in a motoring or motor drive mode wherein power is delivered from the power source 54 to operate the motor. Signal 46, when active, causes circuit 50 to operate the controlled motor in a power regeneration mode wherein power generated by the motor is delivered to the power source 54. Half-bridge drivers $48_1$ and $48_2$ provide the interface between control logic signals 44 and 46 and high power associated with circuit 50 (i.e., high voltage and current). Drivers such as half-bridge driver $48_1$ and $48_2$ are well known in the art and are commercially available, such as, for example, Model IXBD 4410/4411 chip set and 4412/4413 chip set from IXYS Corp., San Jose, Calif. It should be appreciated that drivers 48 may be separate components or may be integrated with deadtime generator 40. Drivers $48_1$ and $48_2$ are functionally identical.

Figure 1A:
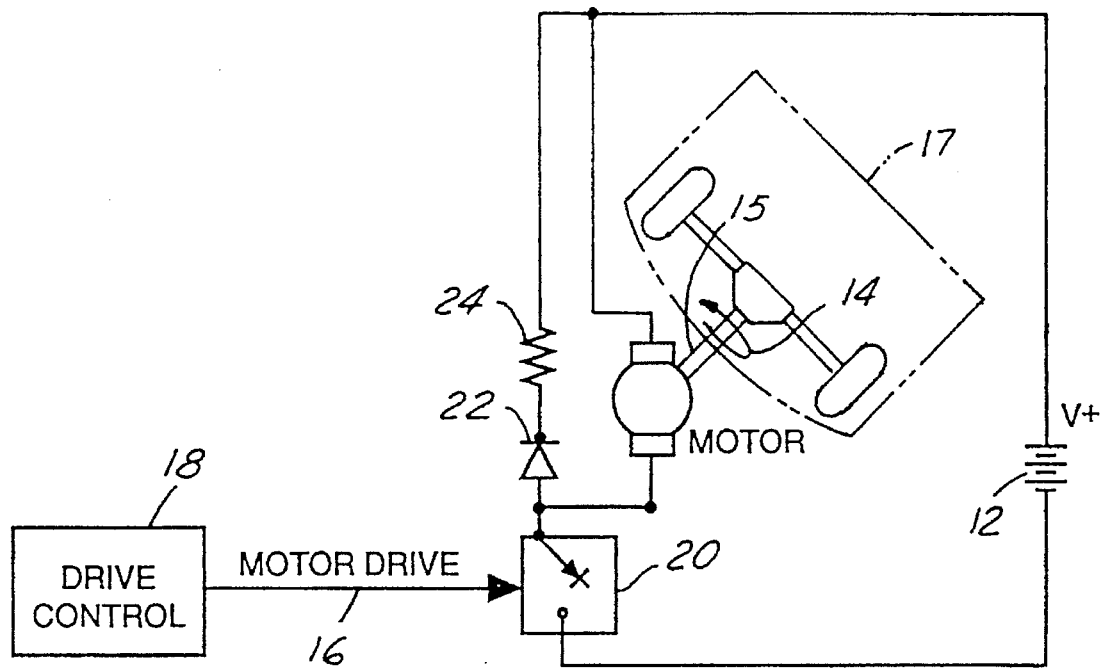
FIG. 1A is a partial equivalent schematic and diagrammatic view of a prior art motor control system.
Figure 1B:
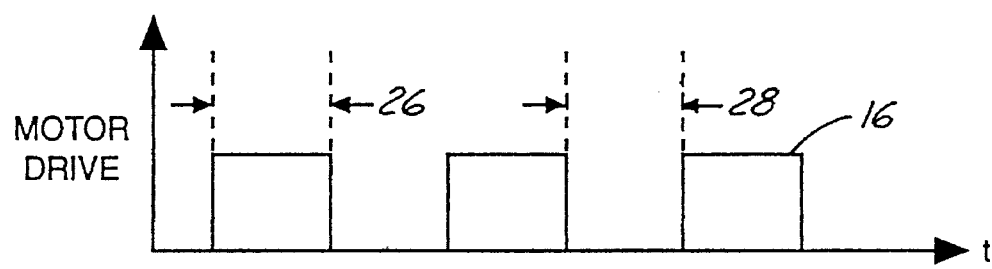
FIG. 1B is a partial timing diagram of the prior art system of FIG. 1A depicting a pulse width modulated motor drive signal.

Motor armature drive circuit 50 provides the means to switch current conduction paths for causing the motor to operate in a power regeneration mode, or in a motor drive mode. It should be appreciated that in circuit 50, semiconductor switch Q1 is used in place of diode 22 and resistor 24 of the prior art control circuit shown in FIG. 1A. This general circuit arrangement is known in the art as a Class C two-quadrant chopper. Semiconductor switches Q1 and Q2 may be power MOSFET devices. It should be appreciated that, although not illustrated in FIGS. 2A or 2B, the semiconductor switches include parasitic diodes disposed for current conduction in a direction opposite the forward conducting direction (see FIG. 3, diodes D1 and D2). Circuit 50 further includes armature 52 of a single phase DC motor being controlled by system 30. Associated with armature 52 is an inductor which may be the internal inductance of the armature or an external inductor in series with the armature. As will be described below, this inductor value is used for energy storage.

Circuit 50 further includes a power source 54 for energizing armature 52 in response to actuation of semiconductor switch Q2. Preferably, power source 54 comprises a rechargeable battery supplying voltage $V^+$.

System 30 further includes field circuit 36 connected to control module 38 for controlling the magnitude and polarity of the field winding of the motor being controlled. Control module 38 generates first and second field command signals 56 and 58 in accordance with well-known control strategies in order to achieve a required motor torque. For example, it is well known in the art to have a relatively large field current upon motor start-up to overcome the high moment of inertia of the mechanical system, and to subsequently lessen the field current as the controlled motor comes up to speed (i.e., weaken the "field"). It is further well known to reverse the polarity of the field current in order to obtain reverse drive of the controlled motor.

Field circuit 36 further includes a pair of deadtime generators $40_2$ and $40_3$ connected to respective field command signals 56 and 58. Deadtime generator $40_2$ generates a field drive signal 60, and an inverted field drive (i.e., field drive) with deadtime signal 62 in accordance with the above description of deadtime generator $40_1$. Similarly, deadtime generator designated $40_3$ generates a second field drive signal 64, and a second field drive with deadtime signal 66 in accordance with the above description of deadtime generator $40_1$. Generators $40_2$ and $40_3$ are functionally identical to $40_1$.

Signals 62, 60, 66 and 64 are conditioned via half-bridge drivers $48_3$–$48_6$, respectively, and are applied to motor field drive circuit 68 to control the field winding 70 of the controlled motor. Drivers $48_3$–$48_6$ are functionally identical to drivers $48_1$–$48_2$.

Figure 2B:
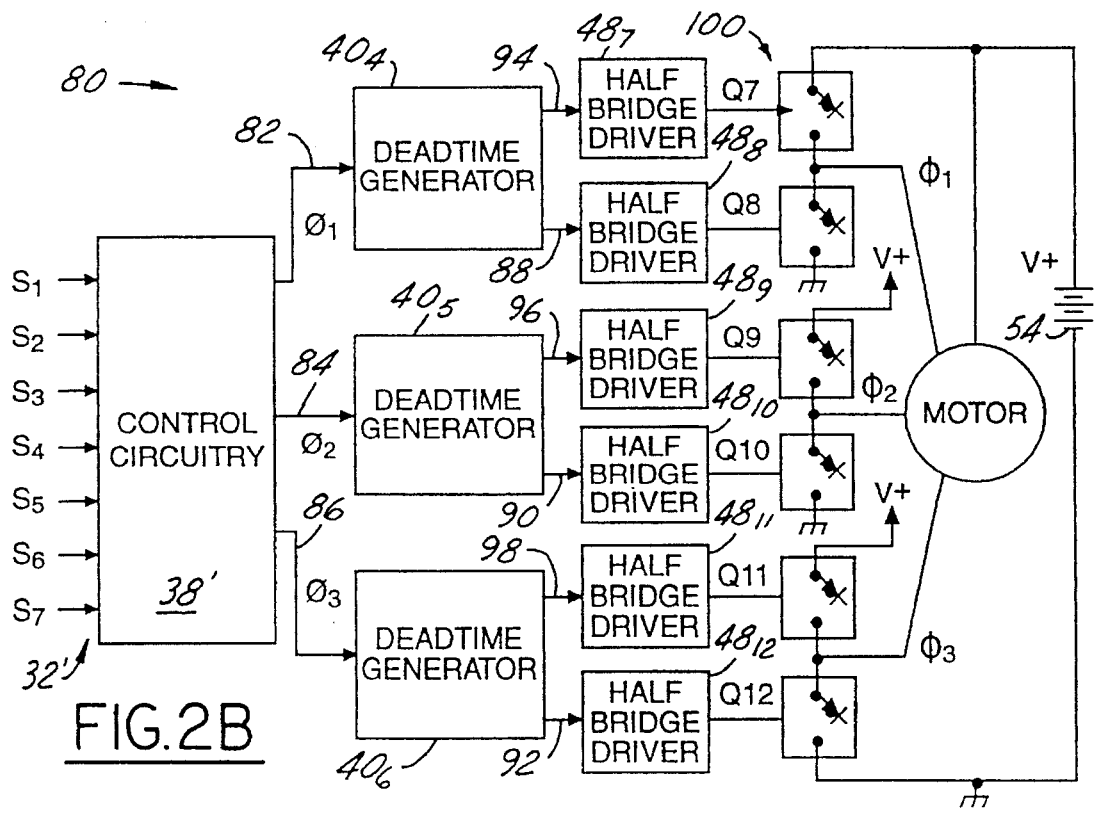
FIGS. 2B is a partial equivalent schematic and block diagram of a motor control in accordance with a preferred embodiment of the present invention adapted to control a three phase induction motor showing an armature circuit for each of the three phases of the controlled motor.

Referring now to FIG. 2B, a preferred embodiment of the present invention involves the control of a three phase induction motor by a control system 80. The configuration of system 80, for each of the phases, is substantially the same as armature circuit 34, as shown in FIG. 2A. Accordingly, system 80 includes control circuitry 32' provided for controlling each of the three phases of operation, and may include a programmable electronic control module 38' and a means for detecting at least one operating parameter and generating a parameter indicative signal ($S_1$–$S_7$), hereinafter referred to as input data signals which are indicative of the parameter protected. Control module 38' may be programmed with multi-dimensional control strategies or logic maps, and may include a data structure representative of the torque braking effect imparted by an internal combustion engine, which takes into account the above-mentioned input data signals to compute or determine a phase one ($I_1$) command signal 82, a phase two ($I_2$) command signal 84 and a phase three ($I_3$) command signal 86, and a power regeneration command, to be described below in greater detail. Control module 38' determines requires magnitude and commutation for the three phases of the controlled motor via predetermined control strategies, well known in the art, and using the same basic steps as outlined above in connection with the description of control module 38 (i.e., throttle position is translated to a torque request, the control module determines vehicle speed, motor speed, and required torque; and further determines the required current magnitude and commutation of each of the three phases using input signals $S_{1-7}$ and the foregoing determinations). The input data signals include throttle position signal $S_1$, brake signal $S_2$, vehicle speed signal $S_3$, motor speed signal $S_4$, battery condition signal $S_5$, electronics temperature signal $S_6$ (see above description of $S_6$), and motor rotor position signal $S_7$.

Signals 82, 84 and 86 are coupled to deadtime generators $40_4$, $40_5$, and $40_6$, respectively. Deadtime generators $40_4$, $40_5$, and $40_6$, generate phase one ($I_1$) drive signal 88, phase two ($I_2$) drive signal 90, and phase three ($I_3$) drive signal 92, respectively. Generators $40_4$, $40_5$, and $40_6$ further generate an inverted phase one drive (phase one drive) with deadtime signal 94, an inverted phase two drive (phase two drive) with deadtime signal 96, and an inverted phase three drive (phase three drive) with deadtime signal 98, respectively. Signals 94, 88, 96, 90, 98 and 92 are conditioned by half-bridge drivers $48_7$–$48_{12}$, respectively, for application to three phase drive circuit 100 for controlling three phase motor 102. Generators $40_4$–$40_6$ are functionally identical to $40_1$; drivers $48_7$–$48_{12}$ are functionally identical to $48_1$. The present invention thus overcomes the problem in the prior art regarding the danger of having the upper and lower switches conducting simultaneously using deadtime generator 40 to inject the required deadtime. Power regeneration can be obtained over a broad range of conditions/speeds, not just during braking. Accordingly, efficiency is greatly increased.

Figure 3:
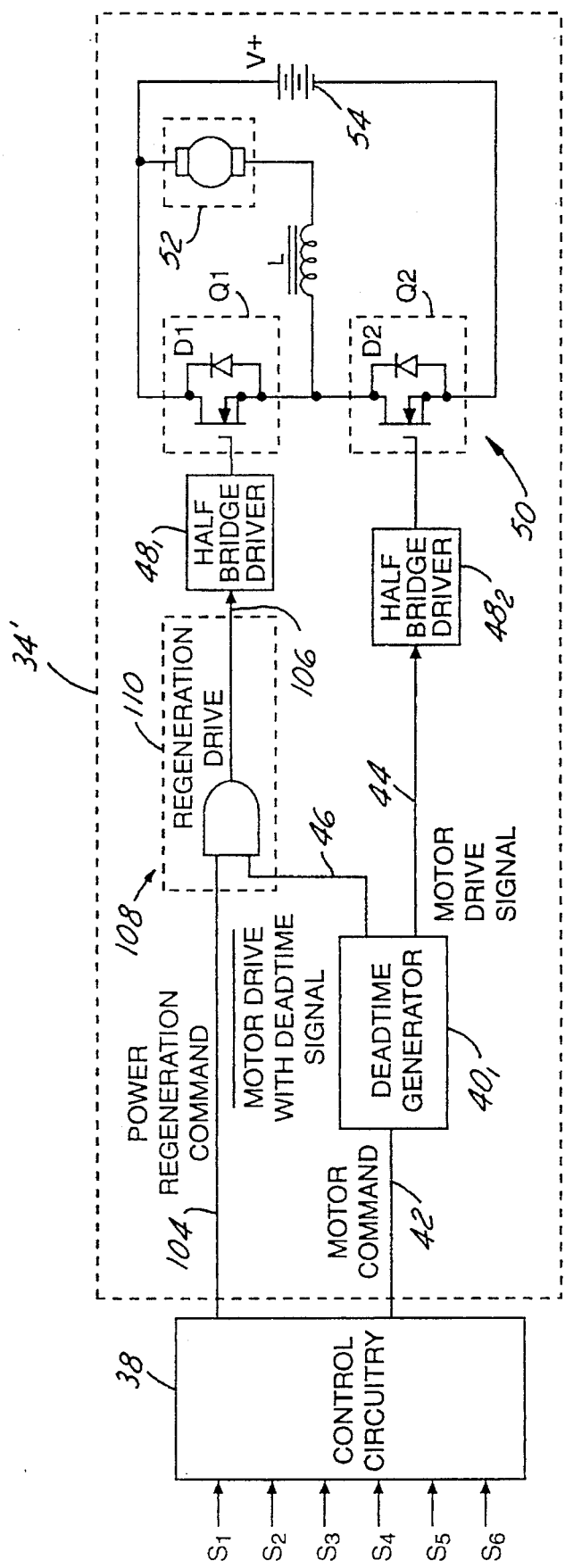
FIG. 3 is a partial equivalent schematic and block diagram showing in greater detail the armature circuit of FIGS. 2A and 2B, including a deadtime generator, a logic circuit for providing a continuously variable regeneration control and an motor armature drive circuit.

FIG. 3 shows a second embodiment of armature circuit 34 of FIG. 2A. It should be understood that the following description of armature circuit 34 is further applicable to the preferred embodiment of the present invention shown in FIG. 2B, wherein an armature circuit 34 is used for each of the three phases of system 80. This embodiment of the present invention provides a continuously variable regeneration control which allows an electric vehicle having an electric motor drive to simulate or model the "dynamic braking" of an internal combustion engine. This feature overcomes a problem in the prior art where electric vehicles are known to have harsh braking effects due to excess torque braking during regeneration. To implement this feature, control module 38 generates a power regeneration command 104 that is translated to a power regeneration drive signal 106, which is thereafter applied to semiconductor switch Q1 of drive circuit 50 via driver $48_1$. Command signal 104 is based on the change in throttle pedal position ($S_1$), brake signal ($S_2$), and the data structure of torque imparted by an internal combustion engine. For example, if the vehicle operator slightly releases the throttle (i.e., vehicle coasting or a "coast" mode), control module 38 increases the amount of regeneration control to duplicate the "dynamic braking" of an internal combustion engine. Logic circuit 108 provides a logic function to continually vary power regeneration, and is responsive to signals 46 and 104 to generate signal 106. Logic circuit 108 preferably includes AND gate 110. Note that circuit 50 includes an inductor L depicted in series with armature 52 of the motor being controlled. It should be appreciated that this inductor may either be internal to armature 52 (i.e., the effective inductance of the armature), or may be an external inductor wired in series with armature 52.

Figure 4D:
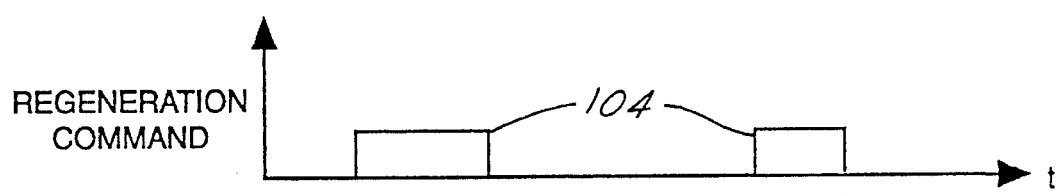
FIG. 4D is a partial timing diagram of a regeneration command signal generated by the control circuitry shown in FIG. 3.
Figure 4E:
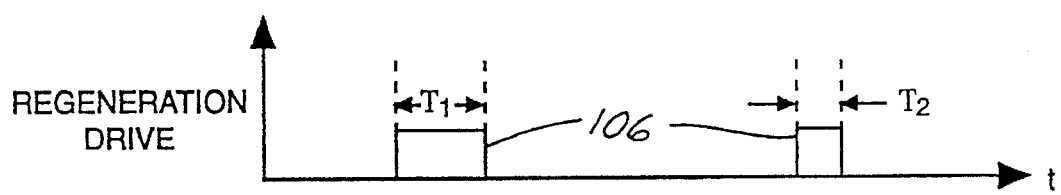
FIG. 4E is a partial timing diagram of a regeneration drive signal generated by the logic circuit shown in FIG. 3.

FIGS. 4A–4E show various signals associated with the schematic diagram of FIG. 3, and are provided to aid in understanding the operation of armature circuit 34. Referring to FIGS. 4A and 4B, motor command 42 is essentially reproduced by deadtime generator $40_1$ to generate motor drive signal 44. Referring to FIG. 4C, deadtime generator $40_1$ further generates a motor drive signal with deadtime signal 46; thus, signals 44 and 46 may be used to drive motoring mode switch Q2, and regeneration mode switch Q1, respectively. Thus, in normal operation, when the state of Q1 and Q2 must change, the conducting transistor is first turned off, then, after a delay (i.e., the deadtime/t), the other transistor is turned on. The delay is presented to ensure that there is no possibility of both transistors conducting at the same time. FIG. 4D shows regeneration command 104 generated by control circuitry 38. It should be appreciated that regeneration command signal 104 may be variable in pulse-length. As shown in FIG. 4E, the regeneration drive signal 106 is the result of AND'ing signals 46 and 104, and provides a continuously variable power regeneration drive signal, illustrated in an exemplary fashion in FIG. 4E by two pulses of length $T_1$ and $T_2$. It should be appreciated that power regeneration drive signal 106 allows complete control of power regeneration of the controlled motor.

Figure 5A:
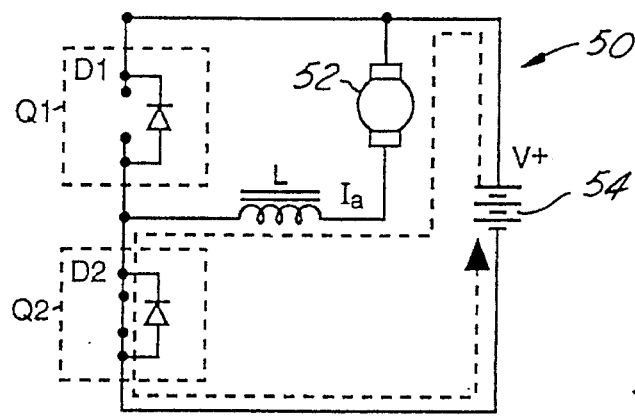
FIG. 5A is a partial equivalent schematic and diagrammatic view of the motor armature drive circuit shown in FIG. 3 in accordance with the present invention, showing a current flow (depicted by a dashed line) when the circuit is in a motoring or motor drive mode.
Figure 5B:
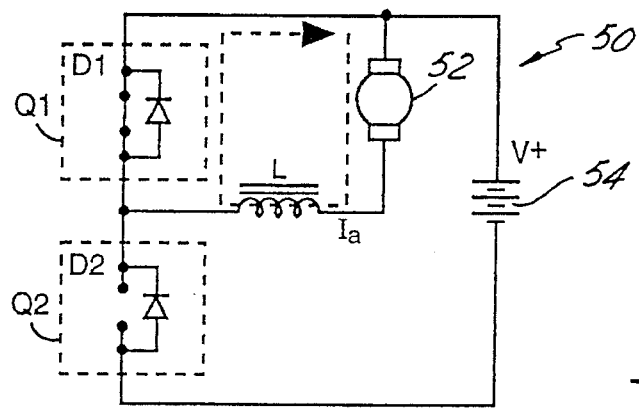
FIG. 5B shows the drive circuit of FIG. 5A and the current flow (depicted by the dashed line) in a first phase of a power regeneration mode.

Referring to FIGS. 5A–5D, the operation of circuit 50 is described in further detail. FIG. 5A shows circuit 50 in a first phase of a motoring or motor drive mode. With switch Q1 off, and switch Q2 on, initially, current flows as indicated by the dashed line and current $I_a$ is positive. The current causes a torque to be produced by the motor which drives the electric vehicle. FIG. 5B shows a first phase of a power regeneration mode. When called for by control module 38 in accordance with the above-described strategies, Q2 is switched off while Q1 is switched on (i.e., closed). It should be appreciated by those of ordinary skill in the art that current through an inductor cannot be changed instantaneously. Accordingly, current $I_a$ maintains its forward direction and takes the path indicated by the dashed line through parasitic diode D1. It should be appreciated that the positive magnitude of current $I_a$ is being continuously decreased due to the back-emf generated by the motor acting as a power generator.

Figure 5C:
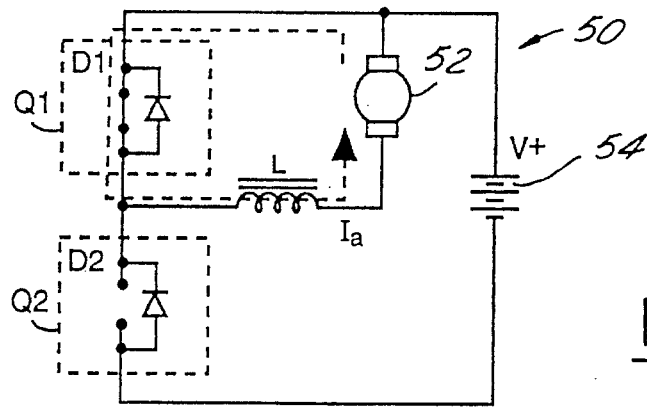
FIG. 5C shows the drive circuit of FIG. 5B in a second phase of the power regeneration mode, particularly the build up of current (by the dashed line) due to the motor operating as a generator.

As current $I_a$ is reduced to zero, the back-emf generated by armature 52 causes current $I_a$ to flow in a direction indicated by the dashed line in FIG. 5C and opposite to that as shown in FIG. 5B. As the magnitude of the current increases, as shown in FIG. 5C, the corresponding energy stored in inductor L is also increased thereby. It should be appreciated that the duration that Q1 is turned "on" determines, in part, the energy stored in inductor L. This duration is determined by signal 104.

Figure 5D:
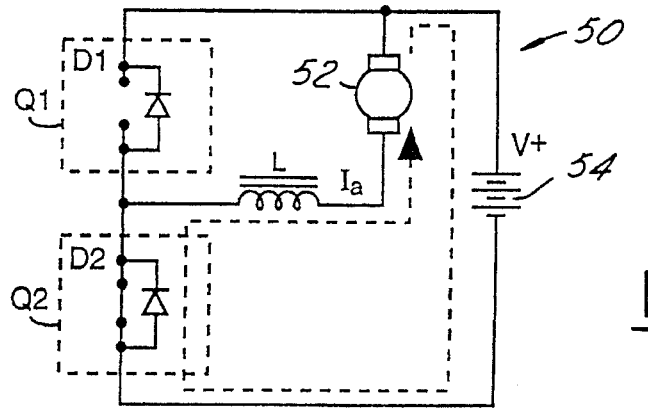
FIG. 5D shows the drive circuit of FIG. 5C wherein the energy stored in the inductor during power regeneration is delivered to the battery in the form of current (as indicated by the dashed line) to thereby charge the battery.

FIG. 5D shows the energy stored in inductor L being delivered to battery 54 to thereby recharge the battery. As described above, the current in an inductor cannot change instantaneously; accordingly, the current as shown in FIG. 5C, flowing through the inductor will continue to flow in the same direction and roughly the same magnitude when semiconductor switch Q1 is initially opened (i.e., turned "off") and Q2 is initially turned on. Note that the magnitude of the charging current then decreases with time.

The advantages of a power regeneration control designed in accordance with the present invention, include the ability for power regeneration over a broad range of operating conditions, not just during braking. Statistics show that for the 95th percentile, a driver brakes only approximately 0.7% of the travelled distance, while in contrast will spend over 75% of the time at or below half peak engine speed. Providing for power generation over a broad range allows for an approximately 50% improvement in regeneration and about 20% improvement in mileage. Further, a control in accordance with the present invention provides the ability to tailor the "braking effect" of an electric motor to match that of an internal combustion engine, whose drivability characteristics many consumers are familiar with and desire.

The preceding description is exemplary rather than limiting in nature. A preferred embodiment of this invention has been disclosed to enable one skilled in the art to practice this invention. Variations and modifications are possible without departing from the purview and spirit of this invention; the scope of which is limited only by the dependent claims.

We claim:

1. A control apparatus for controlling a motor adapted to drive an electric vehicle, comprising:

control means for generating a motor command signal;

deadtime generator means responsive to said motor command signal for generating an inverted motor drive signal having deadtime; and, motor drive means energizable by a power source and coupled to said inverted motor drive signal having deadtime for causing the motor to operate in a power regeneration mode wherein power generated by the motor is delivered to the power source, said motor drive means being further coupled to said motor command signal for causing the motor to operate in a motoring mode wherein power from the power source is delivered to the motor to operate the motor.

2. The control apparatus of claim 1 wherein said control means is responsive to a plurality of operating parameter signals for generating a regeneration command signal, said apparatus further comprising logic means responsive to said regeneration command signal and said inverted motor drive signal for generating a regeneration drive signal, said motor drive means being responsive to said regeneration drive signal to operate the motor in the power regeneration mode.

3. The control apparatus of claim 2 wherein said control means generates said regeneration command signal such that a torque braking effect imparted by the motor when operating in the power regeneration mode is substantially equivalent to an internal combustion engine.

4. The control apparatus of claim 2 wherein the regeneration drive signal is variable.

5. The control apparatus of claim 2 wherein the regeneration drive signal is variable independent of motor command duty cycle.

6. The control apparatus of claim 1 wherein the motor drive means includes a pair of semiconductor switches, a first one of said switches being responsive to said regeneration drive signal to become closed for operating the motor in the power regeneration mode, a second one of said switches being responsive to said motor drive signal to become closed for operating the motor in the motoring mode.

7. The control apparatus of claim 1 wherein the motor is a three-phase induction motor, and wherein each phase of operation of the motor includes at least one deadtime generator and at least one motor drive means.

8. In an electric vehicle motor drive system, a method of motor control, comprising the steps of:

(A) generating a motor drive signal;

(B) inverting the motor drive signal;

(C) injecting a preselected deadtime into the inverted motor drive signal; and, (D) operating the motor in a power regeneration mode using the inverted motor drive signal having deadtime.

9. The method of claim 8 wherein the motor drive signal is of the type having a duty cycle, the duty cycle being determined as a function of a desired motor speed.

10. The method of claim 8 wherein the preselected deadtime is fixed.

11. The method of claim 8 wherein the preselected deadtime is variable.

12. The method of claim 8 further comprising the step of generating a regeneration command signal, and wherein the system includes a motor drive circuit for operating the motor in the power regeneration mode, step (D) including the substeps of:

producing a regeneration drive signal using the regeneration command signal and the inverted motor drive signal having deadtime; and, applying the regeneration drive signal to the motor drive circuit to operate the motor in the power regeneration mode.

13. The method of claim 12 wherein the regeneration drive signal is variable.

14. The method of claim 12 wherein the regeneration drive signal is variable independent of a motor command duty cycle.

15. The method of claim 12 wherein the regeneration command signal generating step includes the substeps of:

detecting a plurality of operating parameters and generating a respective plurality of operating parameter signals indicative of the parameter detected;

generating the regeneration command signal using the operating parameter signals such that a torque braking effect imparted by the motor when operating in a power regeneration mode is substantially equivalent to an internal combustion engine.

16. An apparatus for controlling a motor adapted to drive an electric vehicle, comprising:

a computer coupled to a plurality of operating parameter signals for generating a motor command signal;

a deadtime generator connected to said motor command signal for generating an inverted motor drive signal having deadtime; and, a motor drive circuit energizable by a power source and coupled to said inverted motor drive signal having deadtime for causing the motor to operate in a power regeneration mode wherein power generated by the motor is delivered to the power source, said motor drive circuit being further coupled to said motor command signal for causing the motor to operate in a motoring mode wherein power from the power source is delivered to the motor to operate the motor.

17. The apparatus of claim 16 wherein said computer further generates a regeneration command signal, said apparatus further comprising a logic circuit coupled to said regeneration command signal and said inverted motor drive signal for generating a regeneration drive signal, said motor drive circuit being coupled to said regeneration drive signal to operate the motor in the power regeneration mode.

18. The apparatus of claim 17 wherein the regeneration drive signal is variable.

19. The apparatus of claim 17 wherein the regeneration drive signal is independent of a motor command duty cycle.

20. An apparatus for controlling a motor adapted to drive an electric vehicle, comprising:

control means responsive to a plurality of operating parameter indicative signals for generating motor command and power regeneration command signals;

deadtime generator means responsive to said motor command signal for generating a motor drive signal and an inverted motor drive signal having deadtime;

means responsive to said power regeneration command signal, said motor drive signal, and said inverted motor drive signal for causing the motor to operate in a power regeneration mode wherein power generated by the motor is delivered to a power source; and said control means having means for generating said motor command and regeneration command signals so that the motor operates in a power regeneration mode while the vehicle is coasting.

21. An apparatus for controlling a motor adapted to drive an electric vehicle, comprising:

control means responsive to a plurality of operating parameter indicative signals for generating motor command and power regeneration command signals;

deadtime generator means responsive to said motor command signal for generating a motor drive signal and an inverted motor drive signal having deadtime; and means responsive to said power regeneration command signal, said motor drive signal, and said inverted motor drive signal for causing the motor to operate in a power regeneration mode wherein power generated by the motor is delivered to a power source; and said control means having means for generating said motor command and regeneration command signal so that the motor, when operating in a power regeneration mode, duplicates the reflected torque of an internal combustion engine.

\* \* \* \* \*